(12) United States Patent
Lin et al.

(10) Patent No.: US 12,482,505 B2
(45) Date of Patent: Nov. 25, 2025

(54) PAGE BUFFER CIRCUIT AND OPERATING METHOD THEREOF ADAPTED FOR PAGE READ DEVICE

(71) Applicant: MACRONIX INTERNATIONAL CO., LTD., Hsinchu (TW)

(72) Inventors: Bo-Rong Lin, Taichung (TW);
Han-Wen Hu, Zhubei (TW);
Yung-Chun Li, New Taipei (TW);
Huai-Mu Wang, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 140 days.

(21) Appl. No.: 18/534,840

(22) Filed: Dec. 11, 2023

(65) Prior Publication Data

US 2025/0191621 A1 Jun. 12, 2025

(51) Int. Cl.
*G11C 7/10* (2006.01)
*G11C 7/12* (2006.01)

(52) U.S. Cl.
CPC .......... *G11C 7/1039* (2013.01); *G11C 7/1087* (2013.01); *G11C 7/12* (2013.01)

(58) Field of Classification Search
CPC ................................ G11C 7/1039; G11C 7/10
USPC .................................................... 365/189.05
See application file for complete search history.

(56) References Cited

U.S. PATENT DOCUMENTS

| | | | |
|---|---|---|---|
| 11,656,988 B2 | 5/2023 | Hu et al. | |
| 11,837,290 B2 | 12/2023 | Kwon | |
| 2018/0090227 A1* | 3/2018 | Lee | G11C 7/10 |
| 2021/0382693 A1* | 12/2021 | Song | G06F 7/5443 |
| 2022/0075599 A1* | 3/2022 | Hu | G06F 7/5443 |
| 2023/0127635 A1* | 4/2023 | Jeong | G11C 29/42 |
| | | | 365/233.1 |

FOREIGN PATENT DOCUMENTS

| | | | |
|---|---|---|---|
| CN | 115220690 A | 10/2022 | |
| TW | 202321952 A | 6/2023 | |

\* cited by examiner

*Primary Examiner* — Muna A Techane
(74) *Attorney, Agent, or Firm* — McClure, Qualey & Rodack, LLP

(57) ABSTRACT

A page buffer circuit adapted for a page-read device which including a memory array having several pages and several bit lines. The page buffer circuit comprises the following elements. First latches, receive a weight-vector from a corresponding one of the pages through the bit lines, and import an input-vector through a data input/output path. The weight-vector has a plurality of weight bit-data, and the input-vector has a plurality of input bit-data. Second latches, store the input bit-data of the input-vector. Logic operation units, coupled to the first latches to receive the weight bit-data, and coupled to the second latches to receive the input bit-data, perform a logic operation of the input bit-data and the weight bit-data to generate a logic operation result. The logic operation result is sent to one the first latches. A control circuit, selectively enables the logic operation units to perform the logic operation.

20 Claims, 19 Drawing Sheets

PAGE BUFFER CIRCUIT AND OPERATING METHOD THEREOF ADAPTED FOR PAGE READ DEVICE

TECHNICAL FIELD

The present disclosure relates to a semiconductor device, and in particular, relates to a page buffer circuit for a page read device and an operating method thereof.

BACKGROUND

With the rise of artificial intelligence (AI) technology, various basic computations required for AI operations have been developed, such as vector-vector-multiply (VVM) and multiply-accumulate (MAC). Based on the high-speed access characteristics of the memory, the VVM operation and MAC operation may be achieved by in-memory-computing (IMC) performed by the memory.

However, when the VVM operation and MAC operation have a greater bit-width (that is, performing multi-bit operations), the execution time required for the IMC will be greatly increased.

In view of the above issues, an improved page reading and page buffering mechanism is needed such that page data stored in memory array may be processed more efficiently, and may operate in conjunction with a pipeline operation mechanism, thereby reducing the execution time of the VVM operation and MAC operation.

SUMMARY

According to an aspect of the present disclosure, a page buffer circuit adapted for a page-read device, wherein the page read device includes a memory array having a plurality of pages and a plurality of bit lines, the page buffer circuit comprising the following elements. A plurality of first latches, for receiving a weight-vector from a corresponding one of the pages through the bit lines, and importing an input-vector through a data input/output path, wherein the weight-vector has a plurality of weight bit-data, and the input-vector has a plurality of input bit-data. A plurality of second latches, for storing the input bit-data. A plurality of logic operation units, coupled to the first latches to receive the weight bit-data, and coupled to the second latches to receive the input bit-data, each of the logic operation units is used to perform a logic operation of a corresponding one of the input bit-data and a corresponding one of the weight bit-data to generate a logic operation result, and the logic operation result is sent to one the first latches. A control circuit, for selectively enabling the logic operation units to perform the logic operation.

According to another aspect of the present disclosure, an operating method of a page buffer circuit adapted for a page-read device is provided. The page read device includes a memory array having a plurality of pages and a plurality of bit lines. The operating method comprising the following steps. Receiving a weight-vector from a corresponding one of the pages through the bit lines by a plurality of first latches of the page buffer circuit and importing an input-vector into the first latches through a data input/output path, wherein the weight-vector has a plurality of weight bit-data, and the input-vector has a plurality of input bit-data. Storing the input bit-data in a plurality of second latches of the page buffer circuit. Receiving the weight bit-data from the first latches and receiving the input bit-data from the second latches, by a plurality of logic operation units of the page buffer circuit. Performing a logic operation of a corresponding one of the input bit-data and a corresponding one of the weight bit-data to generate a logic operation result, by each of the logic operation units. Sending the logic operation result to one the first latches. Selectively enabling the logic operation units to perform the logic operation, by a control circuit of the page buffer circuit.

BRIEF DESCRIPTION OF THE DRAWINGS

FIG. 4C is a flow chart of the importing procedure of the input-vector In.

Figure 1:
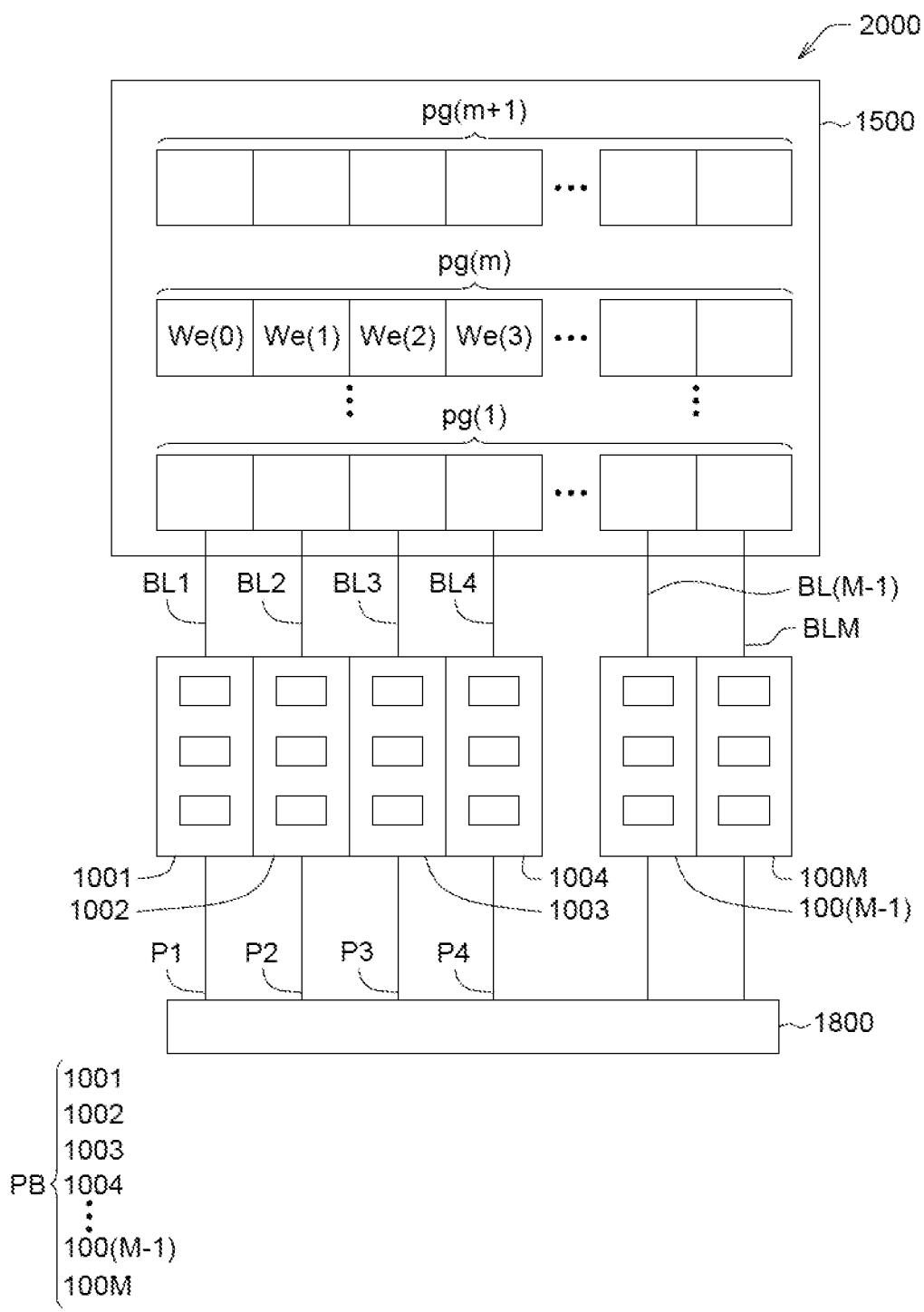
FIG. 1 is a circuit diagram of a memory device 2000 according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Please refer to FIG. 1, which is a circuit diagram of a memory device 2000 according to an embodiment of the present disclosure. The memory device 2000 includes a memory array 1500, a page buffer unit PB and an accumulation circuit 1800. The memory device 2000 has a configuration suitable for performing page read operations (i.e., having page read features), hence the memory device 2000 may be referred to as a "page read device". Correspondingly, the memory array 1500 is suitable for the page read operations. Such as, the memory array 1500 may have a type of a non-volatile memory or a volatile memory, including: NAND flash memory, NOR flash memory, phase change memory (PCM), dynamic random access memory (DRAM), static random access memory (SRAM) or magneto-resistive random access memory (MRAM). Memory array 1500 may have a two-dimensional (2D) structure or a three-dimensional (3D) structure. The memory array 1500 may also have a single-plane structure or a multi-plane structure.

The memory array 1500 includes multiple pages, such as pages pg(1), ..., pg(m) and pg(m+1). Each page includes multiple memory cells. The memory cells may be SLC cells (single-level cells), MLC cells (multiple-level cells), TLC cells (triple-level cells), QLC cells (quad-level cells) or PLC cells, etc. The memory cells are used to store data, such as storing weight data. In this embodiment, a page correspondingly stores a weight-vector We.

The memory array 1500 is coupled to the page buffer unit PB through multiple bit lines, e.g., M bit lines BL1, BL2, BL3, BL4, ..., BL(M−1) and BLM. The page buffer unit PB may perform page-read operations for the pages pg(1)-pg(m+1) of the memory array 1500. The page buffer unit PB includes multiple page buffer circuits, e.g., M page buffer circuits 1001, 1002, 1003, 1004, ..., 100 (M−1) and 100M. The page buffer circuits 1001 to 100M have an equal number "M" as the bit lines BL1 to BLM. The page buffer circuits 1001 to 100M are coupled to the bit lines BL1 to BLM respectively. The weight-vector We stored in the pages pg(1) to pg(m+1) may be read to the page buffer circuits 1001 to 100M through corresponding ones of the bit lines BL1 to BLM.

The weight-vector We may have a bit width of "N", where "N" is less than or equal to the number "M". The weight-vector We includes bit-data $We_x(0)$, $We_x(1)$, ..., and $We_x(N-1)$ which are stored in one of the pages pg(1) to pg(m+1) of the memory array 1500. The bit width "N" represents the number of bits of the weight-vector We, and the index "x" represents the x-th dimension. Such as, the page pg(1) has a size of 16 KB, and the page pg(1) may totally store 64 weight-vector We each having a bit width of "4" and a dimension of "512". The bit-data $We_j(n)$ refers to the bit-data of the j-th bit and the n-th dimension. In the following paragraphs, bit width of "4" (i.e., N=4) and the first dimension (i.e., x=1) are taken as an example, bit-data $We_j(n)$ of the weight-vector We includes bit-data We(0), We(1), We(2) and We(3), and four page buffer circuits 1001-1004 in the page buffer unit PB function to process the bit-data We(0) to We(3) correspondingly. The bit-data We(0) to We(3) may be provided to the page buffer circuits 1001-1004 through the bit lines BL1-BL4 correspondingly.

Furthermore, each of the page buffer circuits 1001-1004 is coupled to an data input/output (I/O) path, Such as, the page buffer circuit 1001 is coupled to an data I/O path P1, the page buffer circuit 1002 is coupled to an data I/O path P2, the page buffer circuit 1003 is coupled to an data I/O path P3, and the page buffer circuit 1004 is coupled to an data I/O path P4. The data I/O paths P1-P4 may correspond to the bit lines BL1-BL4 respectively. An input-vector In with the bit width of "4", is imported to one of the page buffer circuit 1001-1004 through the corresponding one of the data I/O paths P1-P4. Each of the page buffer circuits 1001-1004 performs logic operations on the input-vector In and the weight-vector We.

The page buffer circuits 1001-1004 are coupled to the accumulation circuit 1800. The accumulation circuit 1800 performs an accumulation operation on the results of the logic operations performed by the page buffer circuits 1001-1004. The logic operations by the page buffer circuits 1001-1004 in conjunction with the accumulation operation by the accumulation circuit 1800 form vector-vector multiply (VVM) operations.

Figure 2A:
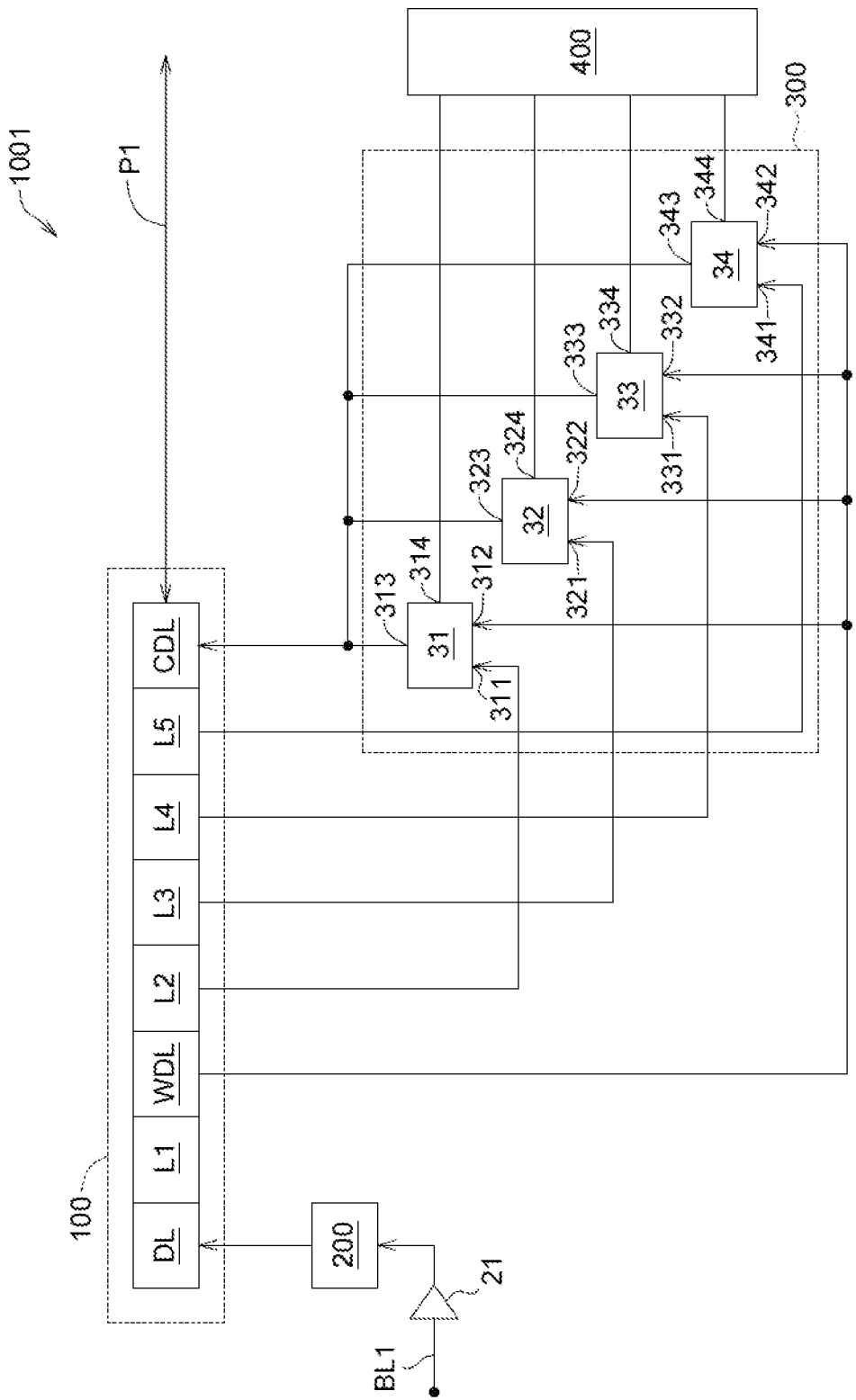
FIG. 2A is a circuit diagram of the page buffer circuit 1001 according to an embodiment of the present disclosure.

Next, please refer to FIG. 2A, which is a circuit diagram of the page buffer circuit 1001 of FIG. 1 according to an embodiment of the present disclosure. The page buffer circuit 1001 is coupled to the memory array 1500 through the bit line BL1. The page buffer circuit 1001 includes a latch circuit 100, a decoding circuit 200, a logic operation circuit 300 and a control circuit 400. The latch circuit 100 includes multiple latches, e.g., eight latches DL, WDL, CDL and L1-L5. The latch DL may be referred to as a "first stage latch" which is disposed at a first stage of the latch circuit 100. The latch WDL may be referred to as a "weight latch", which is disposed at addresses between the latch L1 and the latch L2. The latch CDL may be referred to as a "last stage latch" which is disposed at a last stage of the latch circuit 100. The latches L2-L5 are disposed at addresses between the latch WDL and the latch CDL, and the latches L2-L5 are disposed at continuous addresses. The logic operation circuit 300 includes multiple logic operation units 31-34. The number of logic operation units 31-34 is equal to the number of latches L2-L5 (which is "4").

The latch WDL may be selectively disposed according to a design constraint of the page buffer circuit 1001. If the design constraint is that, the latency (i.e., execution time) for executing the reading procedure of the weight-vector We is less than the latency for executing the VVM operation procedure of the weight-vector We and the input-vector In, then a latch WDL may be disposed in the page buffer circuit 1001. If no need to consider the latency of the reading procedure of the weight-vector We, the latch WDL is not disposed.

The bit line BL1 is coupled to the decoding circuit 200 through a sensing amplifier (SA) 21, and the decoding circuit 200 is coupled to the latch DL. The data transmitted by the bit line BL1 is processed by the sense amplifier 21 and then sent to the decoding circuit 200 for decoding. Taking the memory cells of the memory array 1500 as TLC cells as an example, the decoding circuit 200 decodes 3-bit-data of each of the TLC cells. In other examples, the memory cells of the memory array 1500 may be SLC cells, MLC cells, QLC cells, or PLC cells. If the memory cells are SLC cells, there is no need to dispose the decoding circuit 200.

The logic operation unit 31 has input terminals 311, 312 and 314 and an output terminal 313. The input terminal 311 is coupled to the latch L2, and the input terminal 312 is coupled to the latch WDL. The logic operation unit 31 performs a logic operation based on the data stored in the latch L2 and the data stored in the latch WDL, such as: a logic "AND" operation, a logic "OR" operation, a logic "XOR" operation or a logic "XNOR" operation. The control circuit 400 sends a control signal to the input terminal 314 of the logic operation unit 31 to enable the logic operation unit 31 to perform the logic operation. The operation result is sent to the latch CDL through the output terminal 313.

The operation mechanism of the logic operation units 32, 33 and 34 and the coupling manner of their input terminals and output terminals, are similar to the logic operation unit 31. For example, the input terminals 321, 331 and 341 of the logic operation units 32, 33 and 34 are respectively coupled to the latches L3, L4 and L5. The input terminals 322, 332 and 342 of the logic operation units 32, 33 and 34 are commonly coupled to the latch WDL. The logic operation units 32, 33 and 34 respectively perform logic operations according to the data of the latches L3, L4 and L5 and the data of the latch WDL. In this embodiment, the logic operation units 31-34 all perform the same type of logic operations, for example, they all perform logic "AND" operations. The output terminals 313-343 of the logic operation units 31-34 are commonly coupled to the latch CDL. The control circuit 400 sends control signals to the input terminals 314-344 of the logic operation units 31-34. In the same operation cycle, only one of the logic operation units 31-34 sends the operation result to the latch CDL.

The data I/O path P1 is coupled to the latch CDL. The operation result stored in the latch CDL is transmitted to an external circuit (such as the accumulation circuit 1800) through the data I/O path P1.

Figure 2B:
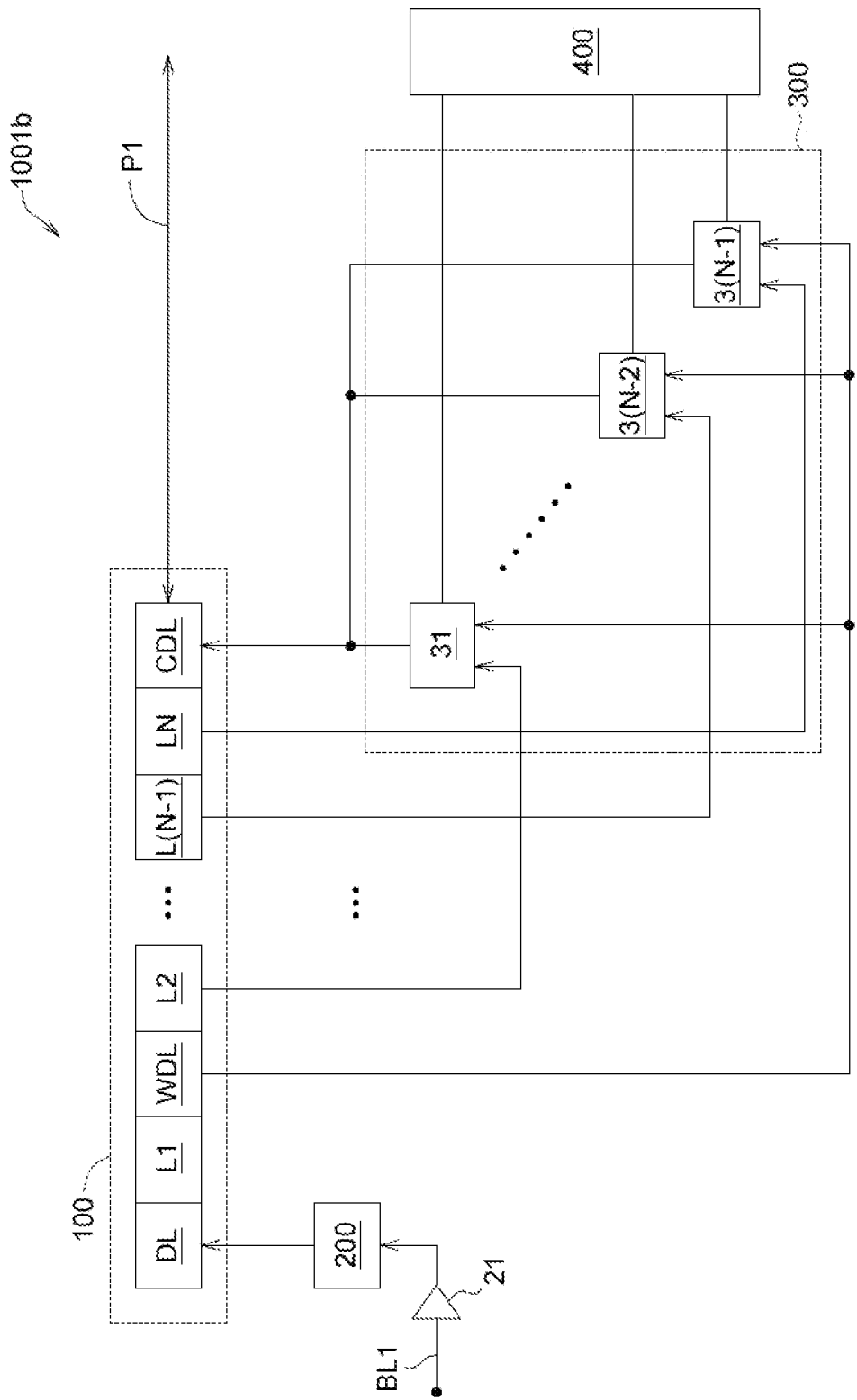
FIG. 2B is a circuit diagram of a page buffer circuit 1001b according to another embodiment of the disclosure.

Next, please refer to FIG. 2B, which is a circuit diagram of a page buffer circuit 1001*b* according to another embodiment of the disclosure. The page buffer circuit 1001*b* of this embodiment may be provided with more latches according to design requirements or design constraints, such as N latches L1-LN. Correspondingly, the page buffer circuit 1001*b* is provided with (N−1) logic operation units 31 to 3(N−1) to respectively perform logic operations on the data of the latches L2-LN and the data of the latch WDL.

Figure 2C:
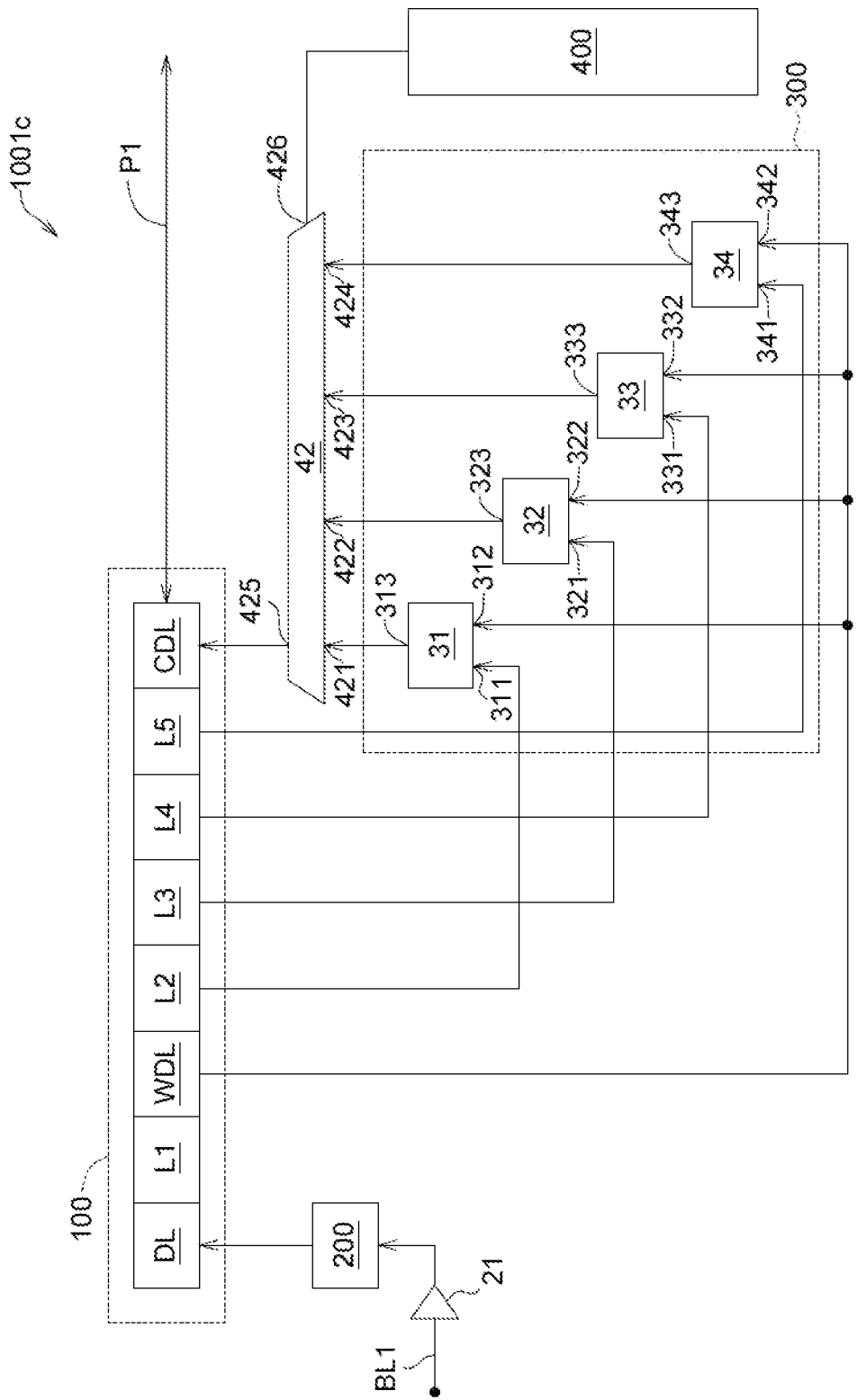
FIG. 2C is a circuit diagram of a page buffer circuit 1001c according to yet another embodiment of the present disclosure.

Next, please refer to FIG. 2C, which is a circuit diagram of a page buffer circuit 1001*c* according to yet another embodiment of the present disclosure. The page buffer circuit 1001*c* of this embodiment further includes a multiplexer 42. The multiplexer 42 selects to transmit an operation result of one of the logic operation units 31-34 to the latch CDL without need to enable and select the logic operation units 31-34 by control signals of the control circuit 400.

The output terminals 313, 323, 333 and 343 of the logic operation units 31, 32, 33 and 34 are respectively coupled to the input terminals 421, 422, 423 and 424 of the multiplexer 42 to transmit the operation results. The input terminal 426 of the multiplexer 42 receives a control signal of the control circuit 400, so as to select and transmit an operation result received by one of the input terminals 421, 422, 423 and 424 to the output terminal 425, and then to the latch CDL.

Figure 3:
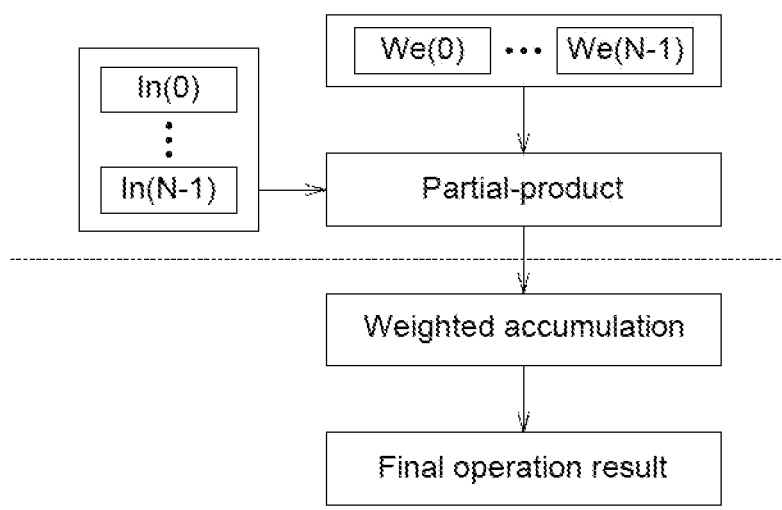
FIG. 3 is a schematic diagram of the basic operation of the page buffer circuit 1001.

Next, please refer to FIG. 3, which is a schematic diagram of the basic operation of the page buffer circuit 1001. The page buffer circuit 1001 performs logic operations on the input-vector In and the weight-vector We. The bit width of the input-vector In is "N", and the input-vector In includes N bit-data In(0), In(1), . . . , and In(N−1). The bit-data In(0) to In(N−1) of the input-vector In are sequentially imported to the page buffer circuit 1001 through the data I/O path P1.

On the other hand, the weight-vector We is stored in the memory array 1500. The bit width of the weight-vector We is also equal to "N" and includes N bit-data We(0), We(1), . . . , and We(N−1). The bit-data We(0) to We(N−1) of the weight-vector We may be stored in one page of the memory array 1500, and may be read to the respective page buffer circuits corresponding to the bit lines in a parallel manner. Taking the bit width "N" equal to "4" as an example, the bit-data We(0) may be read to the page buffer circuit 1001, the bit-data We(1) may be read to the page buffer circuit 1002, the bit-data We(2) may be read to the page buffer circuit 1003, and the bit-data We(3) may be read to the page buffer circuit 1004.

Then, in each of the page buffer circuits 1001-1004, a partial-product operation is performed for the bit-data of the input-vector In and the corresponding bit-data of the weight-vector We.

Then, the page buffer circuit 1001 transmits the operation result of the partial-product to the accumulation circuit 1800. A weighted accumulation operation is performed by accumulation circuit 1800 sequentially, to obtain a final operation result of VVM/MAC operations.

Next, please refer to FIGS. 4A to 4D, which are flow charts of the WVM/MAC operations performed by the page buffer unit PB and the accumulation circuit 1800, and refer to the schematic diagrams of the operation of the page buffer circuit 1001 shown in FIGS. 5A to 5H. In FIGS. 4A to 4D and 5A to 5H, the bit width of the input-vector In and the weight-vector We both equal to "4", and the logic operation units 31-34 all execute logic "AND" operation, are taken as examples for describing.

Figure 4A:
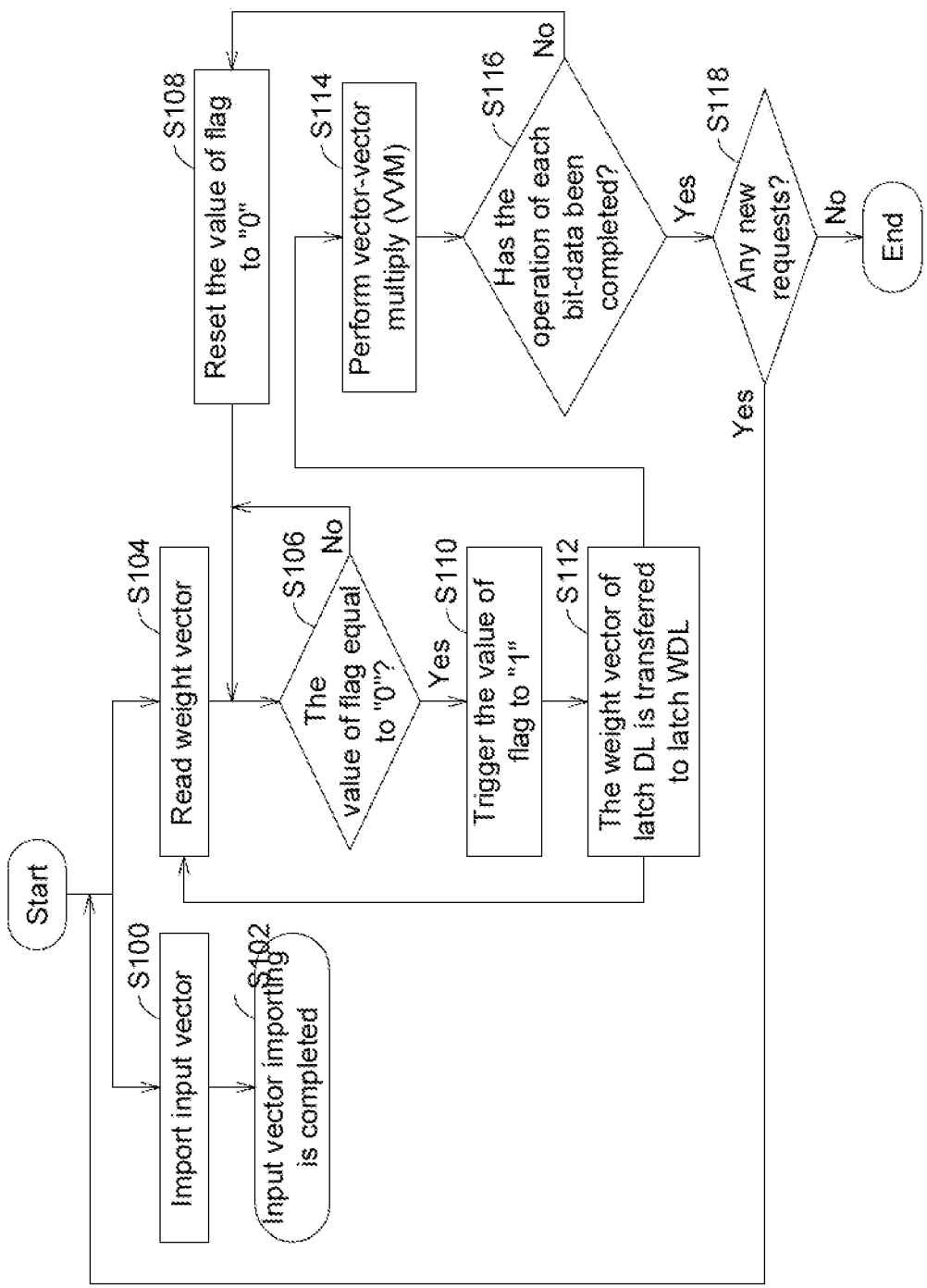
FIG. 4A is a flow chart of a main procedure of VVM/MAC operations executed by the page buffer unit PB and the accumulation circuit 1800.

First, please refer to FIG. 4A, which is a flow chart of a main procedure of VVM/MAC operations executed by the page buffer unit PB and the accumulation circuit 1800. In step S100, the input-vector In is imported into the page buffer circuit 1001 through the corresponding data I/O path P1. Then, in step S102, it is confirmed that importing for the input-vector In is completed. On the other hand, step S104 is executed: reading the weight-vector We to the page buffer circuit 1001. Step S104 may be executed synchronously with step S100, or, executed before or after step S100. The weight-vector We is originally stored in a current page (for example, page pg(m)) of the memory array 1500. The weight-vector We is read to the page buffer circuit 1001 through the bit line BL1, and the weight-vector We is decoded by the decoding circuit 200. Furthermore, the corresponding bit-data (such as We(0)) of the weight-vector We are stored in the latch DL of corresponding page buffer circuit 1001.

In the embodiment of FIG. 4A, the design constraint of the page buffer circuit 1001 is that, the latency (i.e., the required execution time) of the reading procedure of the weight-vector We is less than the latency of the VVM/MAC operations between weight-vector We and input-vector In. Therefore, the flow process of FIG. 4A includes steps S106, S110 and S112: transmitting the weight-vector We in the latch DL to the latch WDL. More specifically, in steps S106, S110 and S112, selectively transmitting the weight-vector We from the latch DL to the latch WDL according to a value of the flag. The weight-vector We is changed to store in the latch WDL from the latch DL, in a form of "internally transfer" within the page buffer circuit 1001.

First, in step S106, it is determined whether the value of the flag is equal to "0". If the determination result is "yes", step S110 is executed: triggering the value of the flag as "1". If the determination result is "no", then step S106 is re-executed.

When the value of the flag is trigger as "1" in step S110, it means that the weight-vector We should be transferred to the latch WDL, then step S112 is executed: transferring the weight-vector We from the latch DL to the latch WDL. Then, step S114 is executed: executing the VVM operation of the weight-vector We and the input-vector In within the page buffer circuit 1001. The WVM operation in step S114 may include partial-product operations and accumulations. Firstly, the partial-product operations are performed as: sequentially executing partial-product operations of the bit-data of the weight-vector We and the corresponding bit-data of the input-vector In. For example, performing the partial-product operation of bit-data We(0) and bit-data In(0), and performing the partial-product operation of bit-data We(0) and bit-data In(1), then performing the partial-product operation of bit-data We(0) and bit-data In(2), and so on. Secondly, accumulations are performed as: summing the results of the partial-product operations. Such as, the product of bit-data We(0) and bit-data In(0) is summed up with the product of bit-data We(0) and bit-data In(1), and then summed up with the product of bit-data We(0) and bit-data In(2), etc.

Then, step S116 is executed: determining whether the partial-product operation of each bit-data of the weight-vector We and the input-vector In is completed. If the determination result in step S116 is "yes", step S118 is executed: determining whether there is a new request. The new request may request to perform an operation of the next input-vector In with the weight-vector We of the first page pg(1). If the determination result in step S116 is "no", step S108 is re-executed: resetting the flag as "0".

In step S118, if the determination result is "no", then this flow process ends. If the determination result is "yes", step S100 is re-executed to import the new input-vector In into the page buffer circuit 1001, and step S104 is synchronously executed to read the weight-vector We into the page buffer circuit 1001.

Figure 4B:
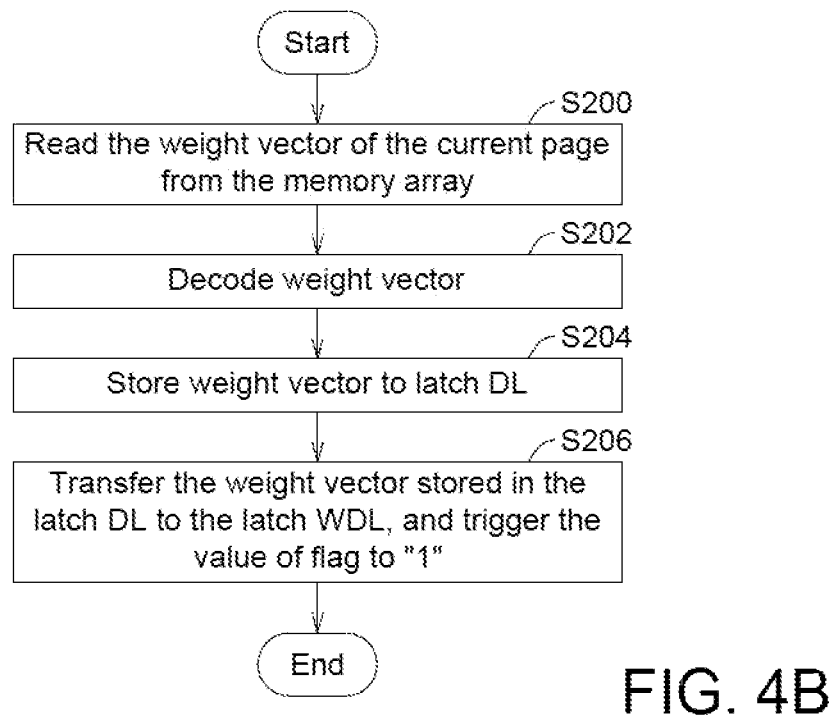
FIG. 4B is a flow chart of the reading procedure of the weight-vector We.

Next, please refer to FIG. 4B, which is a flow chart of the reading procedure of the weight-vector We (i.e., a detailed process of step S104 in FIG. 4A). The process of FIG. 4B is described by reference to the schematic diagram of operation of the page buffer circuit 1001 of FIG. 5A. First, step S200 is performed: reading the weight-vector We stored in the current page (e.g., page pg(m)) from the memory array 1500. Then, step S202 is executed: decoding the weight-vector We by the decoding circuit 200.

Then, step S204 is executed: corresponding bit-data of the decoded weight-vector We are stored in the latches DL of the page buffer circuits 1001-1004. Such as, the bit-data We(0) is stored in the latch DL of page buffer circuit 1001, the bit-data We(1) is stored in the latch DL of page buffer circuit 1002, the bit-data We(2) is stored in the latch DL of page buffer circuit 1003, and the bit-data We(3) is stored in the latch DL of page buffer circuit 1004.

Then, step S206 is executed: triggering the value of the flag as "1", and transmitting the weight-vector We stored in the latch DL to the latch WDL. The latches WDL of the page buffer circuits 1001-1004 store bit-data We(0) to We(3). respectively. Such as, the latch WDL of page buffer circuit 1001 stores the bit-data We(0), the latch WDL of page buffer circuit 1002 stores the bit-data We(1), the latch WDL of page buffer circuit 1003 stores the bit-data We(2), and the latch WDL of page buffer circuit 1004 stores the bit-data We(3).

Figure 4C:
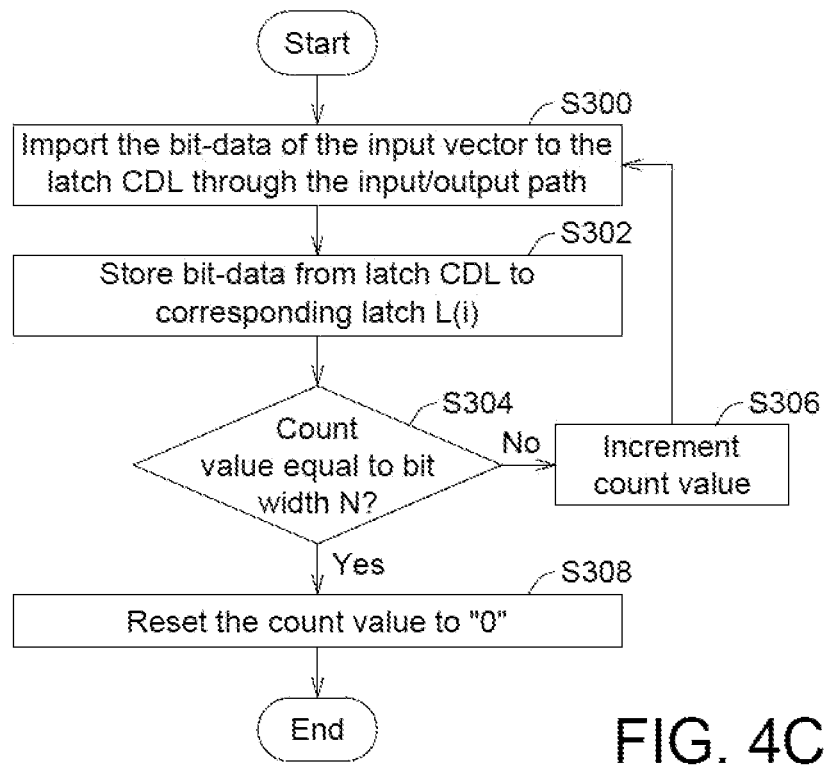

Next, please refer to FIG. 4C, which is a flow chart of the importing procedure of the input-vector In(i.e., the detailed process of step S100 in FIG. 4A). The process in FIG. 4C is described by reference to the schematic diagrams of operations of the page buffer circuit 1001 in FIGS. 5B to 5D.

Figure 5A:
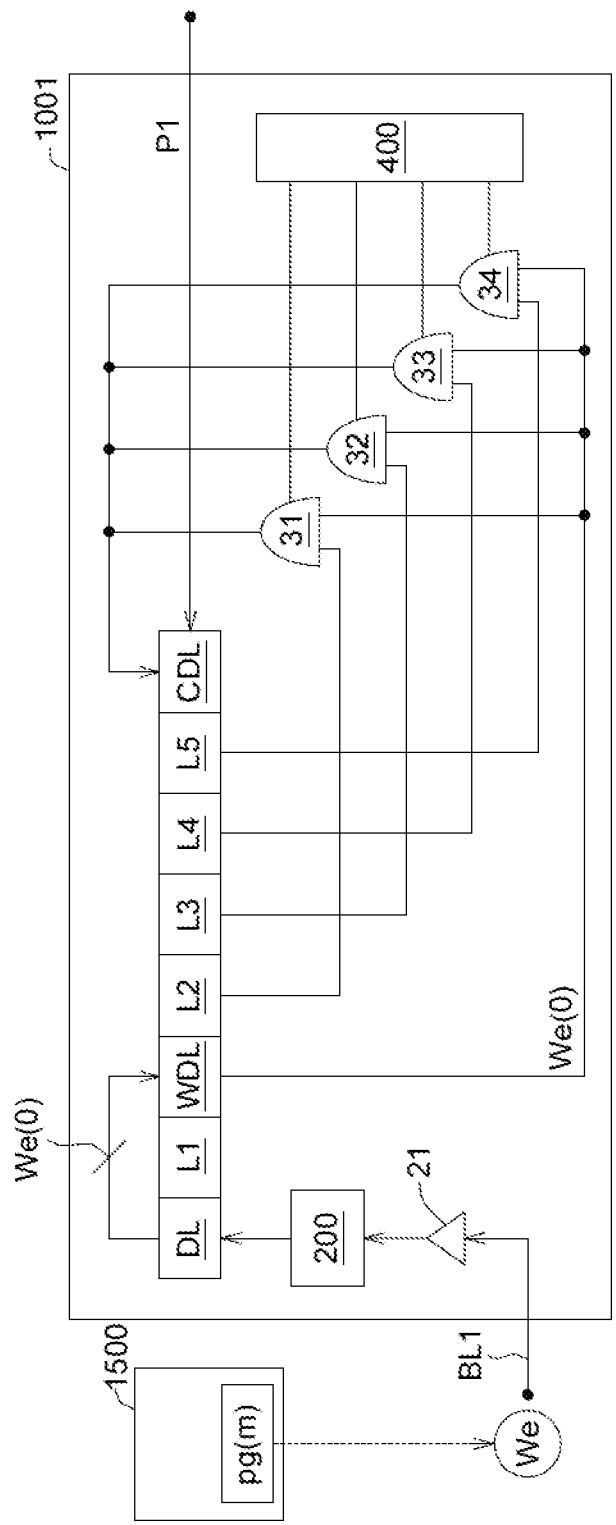
FIGS. 5A to 5H are schematic diagrams of operations of the page buffer circuit 1001.
Figure 5B:
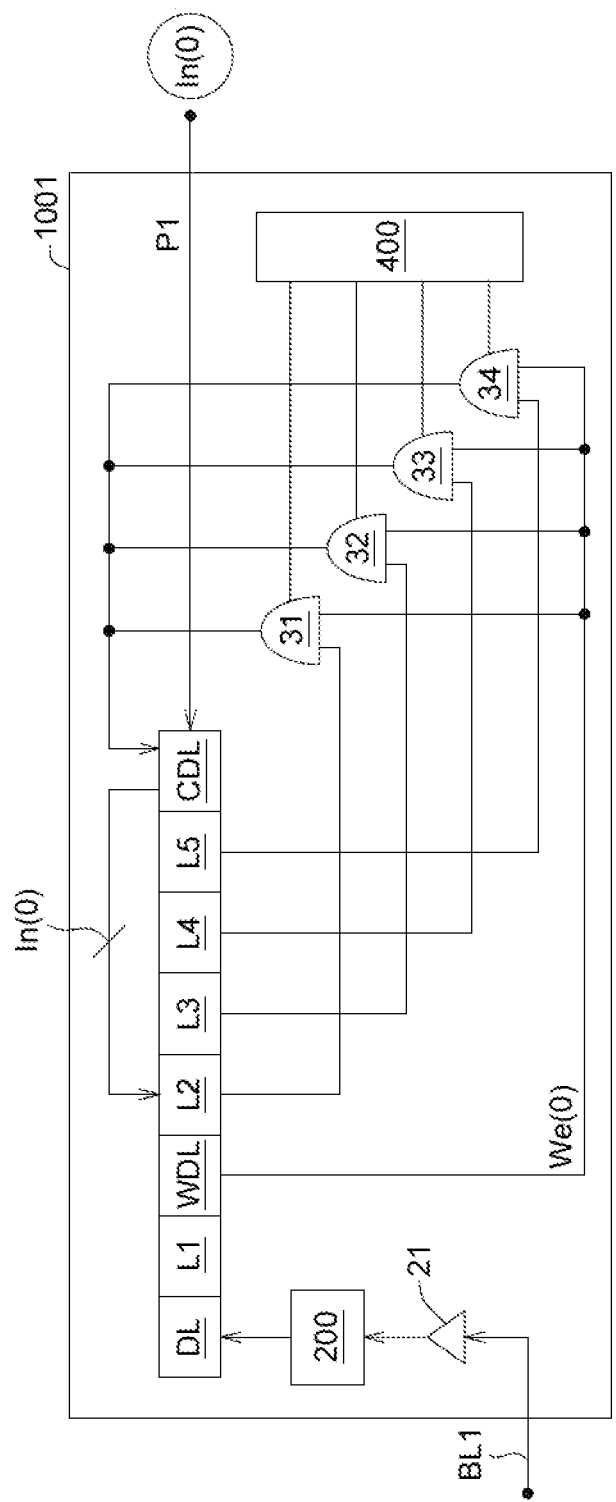

Firstly, referring to FIG. 5B, in step S300 of FIG. 4C, the first bit-data In(0) of the input-vector In is imported into latch CDL through the data I/O path P1. At this time, an initial value of the count value cnt is "0". Then, step S302 is executed: storing the bit-data In(0) of the input-vector In to the corresponding latch L (i) (for example, the latch L2) from the latch CDL. Then, in step S304, it is determined whether the count value cnt is equal to the bit width N of the input-vector In(N is equal to "4" in this embodiment). If the determination result is "no", it means that all the bit-data of the input-vector In have not been imported into the page buffer circuit 1001, then step S306 is executed: incrementing the count value cnt from "0" to "1". Then, step S300 is executed again.

Figure 5C:
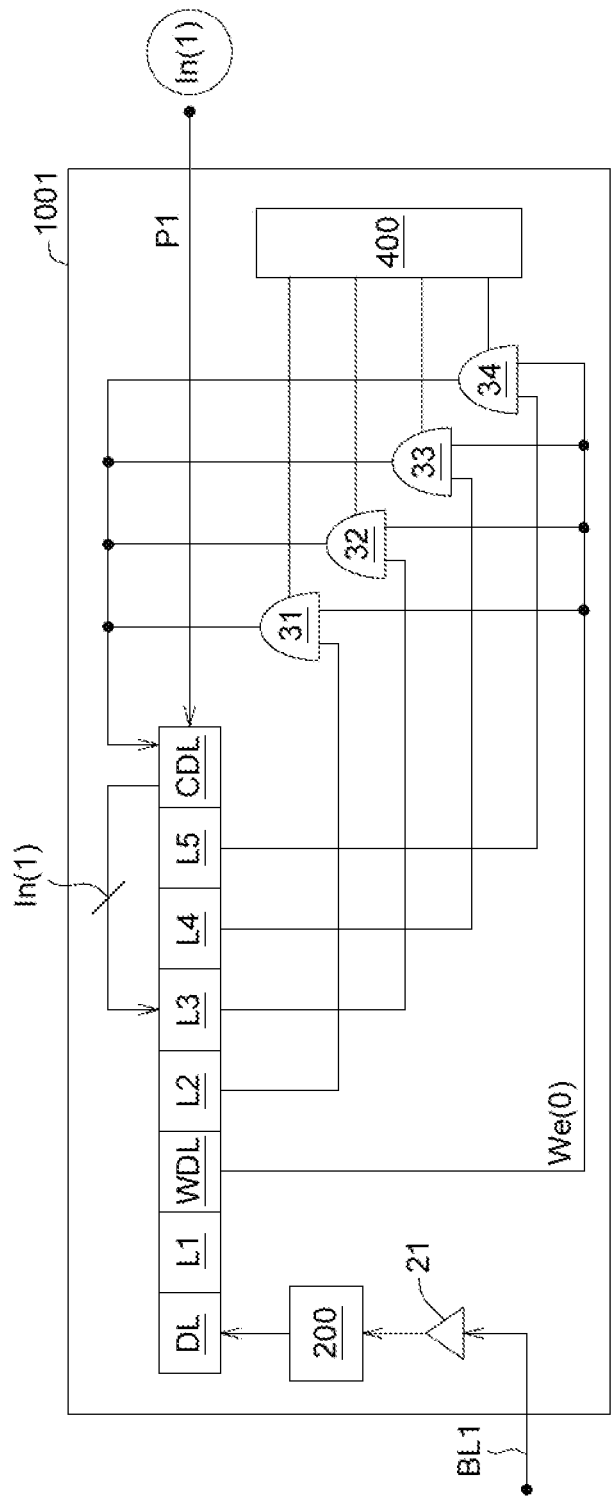

Referring to FIG. 5C, in the re-executed step S300, the second bit-data In(1) of the input-vector In is transmitted to the latch CDL through the data I/O path P1. Then step S302 is executed: storing the bit-data In(1) of the input-vector In to the corresponding latch L3 from the latch CDL. Then step S304 is executed: determining whether the count value cnt is equal to the bit width "4" of the input-vector In. If the determination result is "no", step S306 is executed to increment the count value cnt to "2", and step S300 is executed again.

Figure 5D:
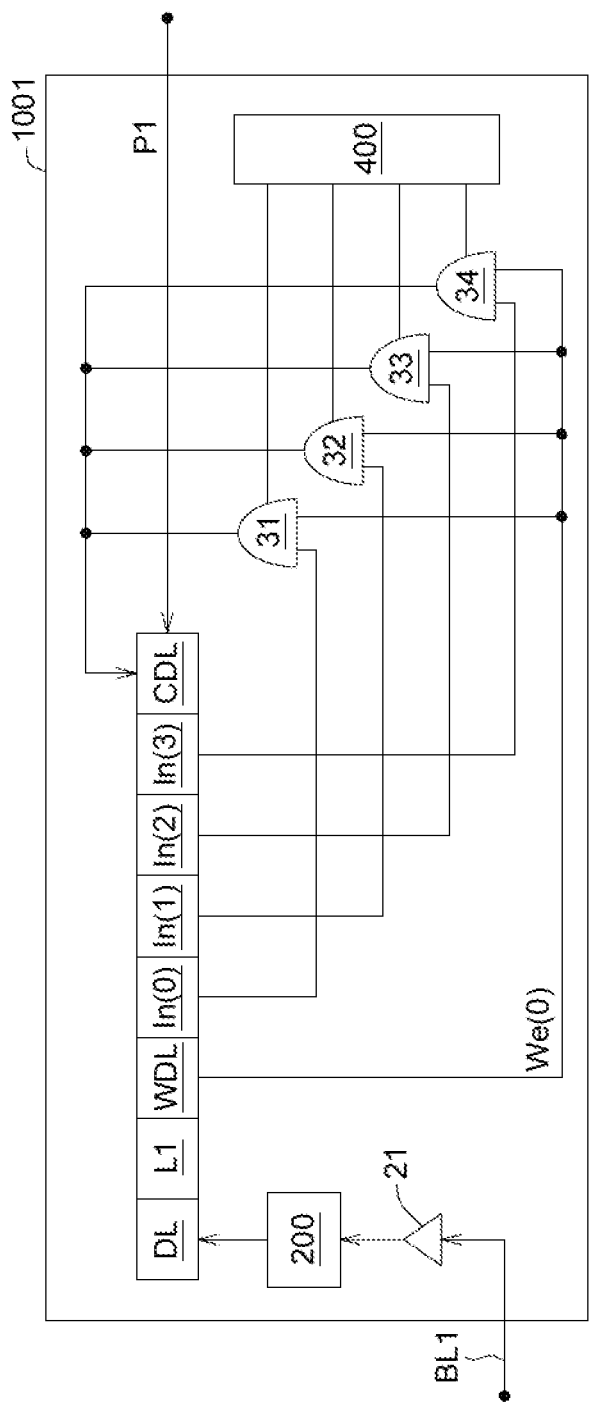

Likewise, in the re-executed steps S300 to S306, the other two bit-data In(2) and In(3) of the input-vector In are transmitted to the latch CDL and then stored in the corresponding latches L4 and L5. Referring to FIG. 5D, at this time, the latches L2-L5 have respectively stored the bit-data In(0)-In(3) of the input-vector In. And the count value cnt has been incremented to "4". Then, step S308 is executed: resetting the count value cnt as "0".

In other examples, the bit-data In(0)-In(3) of the input-vector In may be stored in the latches L2-L5 according to different orders. For example, the bit-data In(0) may be stored in the latch L3, and the bit-data In(1) may be stored in the latch L2, and so on.

Figure 4D:
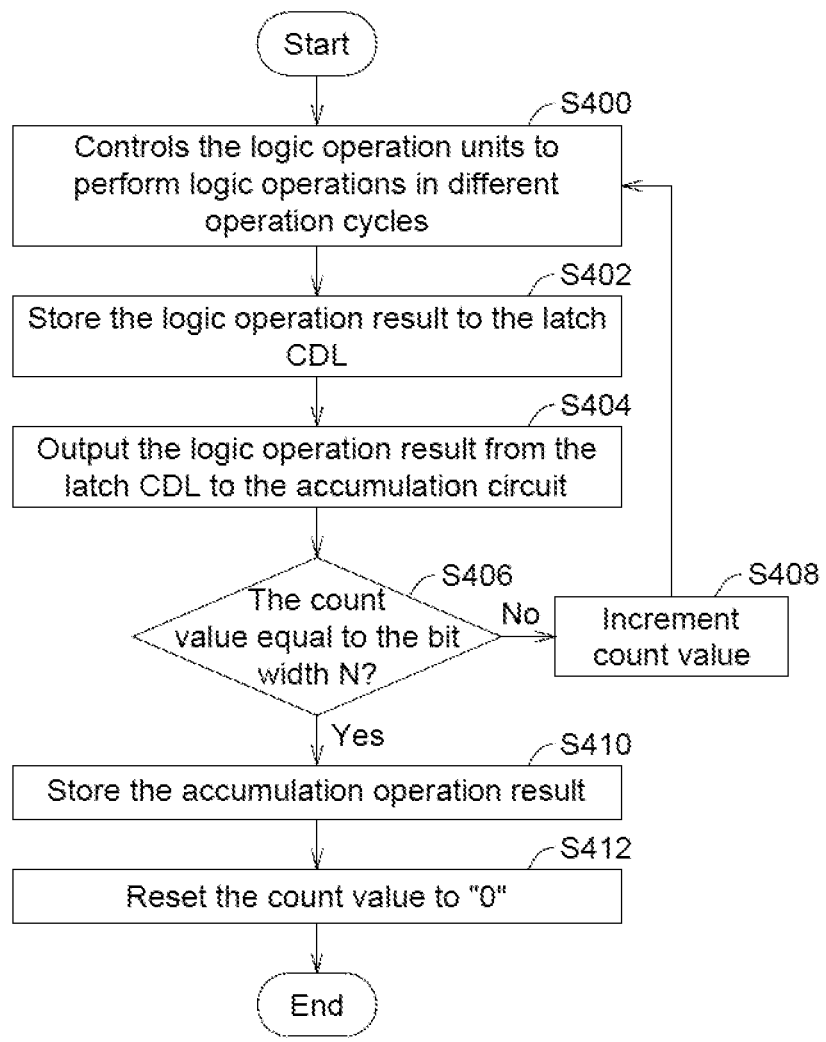
FIG. 4D is a flow chart of the VVM operation

Next, please refer to FIG. 4D, which is a flow chart of the VVM operation (i.e., the detailed process of step S114 in FIG. 4A). The process of FIG. 4D is described with reference to the schematic diagrams of operation of the page buffer circuit 1001 in FIGS. 5E-5H.

Figure 5E:
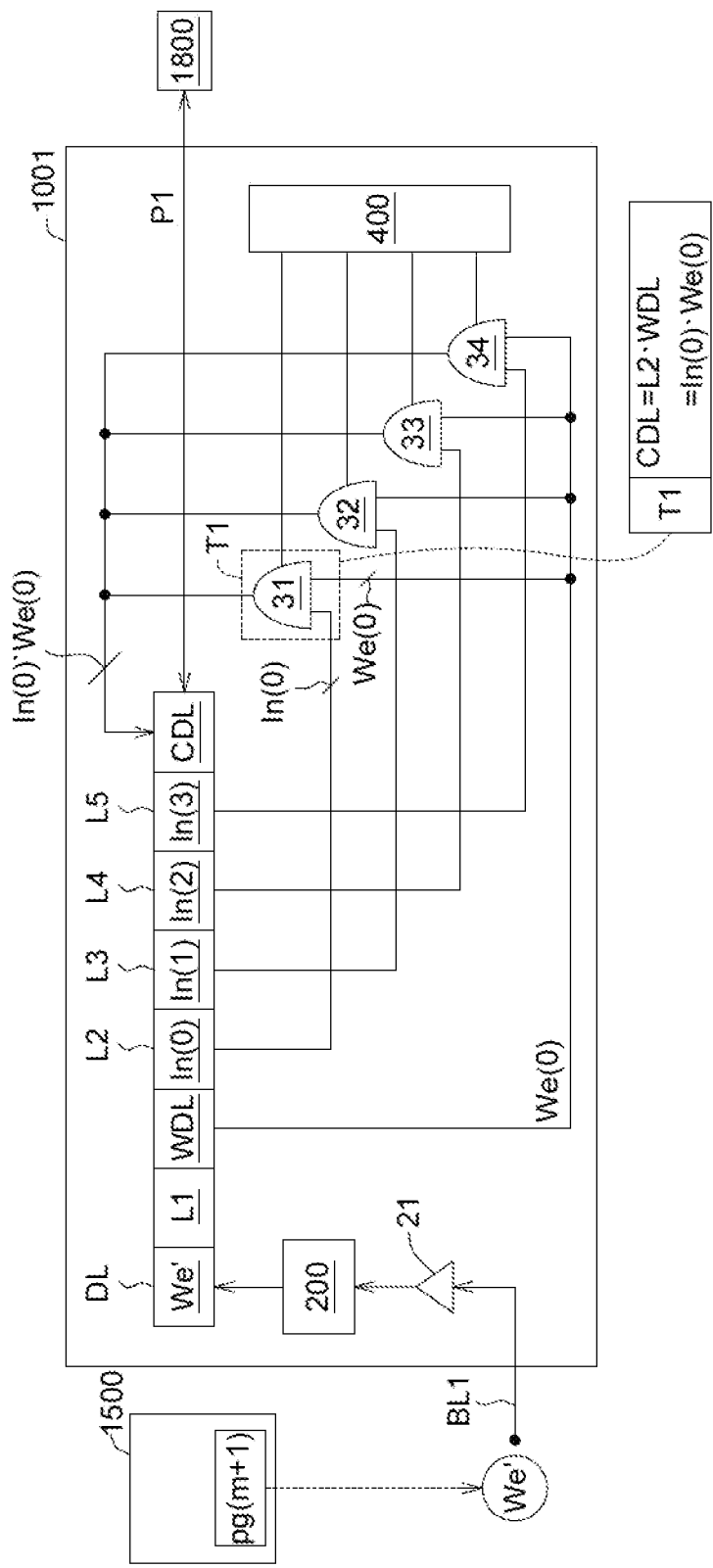
Figure 5F:
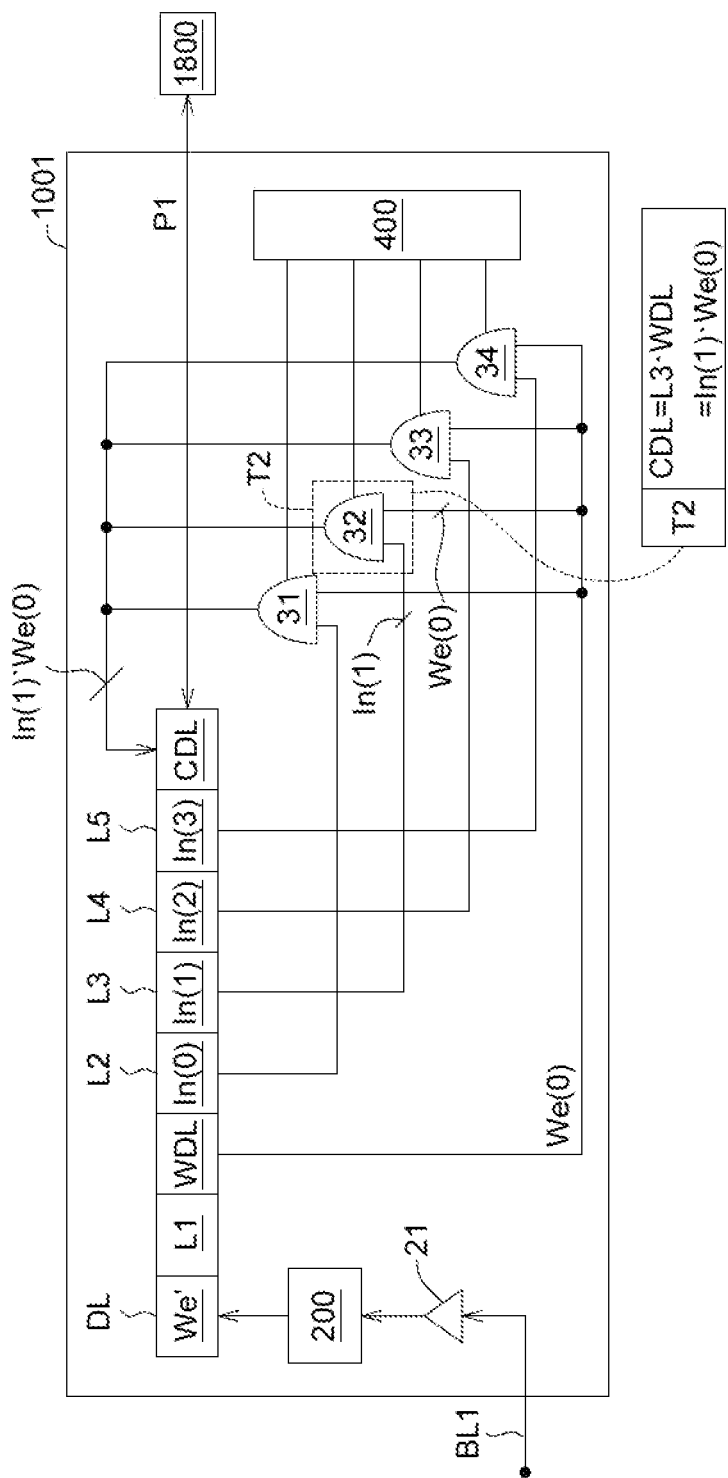

First, step S400 is performed: the control circuit 400 controls the enabling state of the logic operation units 31-34, such that the logic operation units 31-34 selectively perform logic operations in different operation cycles. In this embodiment, the control circuit 400 may control the enabling states of the logic operation units 31-34 according to a finite-state-machine (FSM), so to enable logic operation units 31, 32, 33 and 34 in operation periods T1, T2, T3, and T4 respectively to perform logic operations to generate operation results. For example, as shown in FIG. 5E, in the operation cycle T1, the logic operation unit 31 is enabled to perform a logic operation (e.g., logic "AND" operation) on bit-data We(0) and bit-data In(0) to generate an operation result In(0)·We(0). At the same time, the weight-vector We' of the next page pg(m+1) of the memory array 1500 is read to the page buffer circuit 1001 through the bit line BL1.

Then, step S402 is executed: storing the operation result In(0)·We(0) of the logic operation unit 31 into the latch CDL. At the same time, the decoding circuit 200 decodes the weight-vector We'.

Then, step S404 is performed: outputting the operation result In(0)·We(0) of the logic operation unit 31 from the latch CDL to the accumulation circuit 1800, so to perform the accumulation operation. At the same time, the decoded weight-vector We' is stored in the latch DL.

Then, step S406 is executed: determining whether the count value cnt is equal to the bit width "4". If the determination result is "no", step S408 is executed to increment the count value cnt. Then steps S400 to S404 are re-executed (also referring to FIG. 5F): in the next operation cycle T2, the control circuit 400 enables another logic operation unit 32 to execute the logic "AND" operation of the bit-data We(0) and the bit-data In(1) to produce an operation result In(1)·We(0). Furthermore, the operation result In(1)·We(0) is sent to the latch CDL, and then outputted to the accumulation circuit 1800.

Figure 5G:
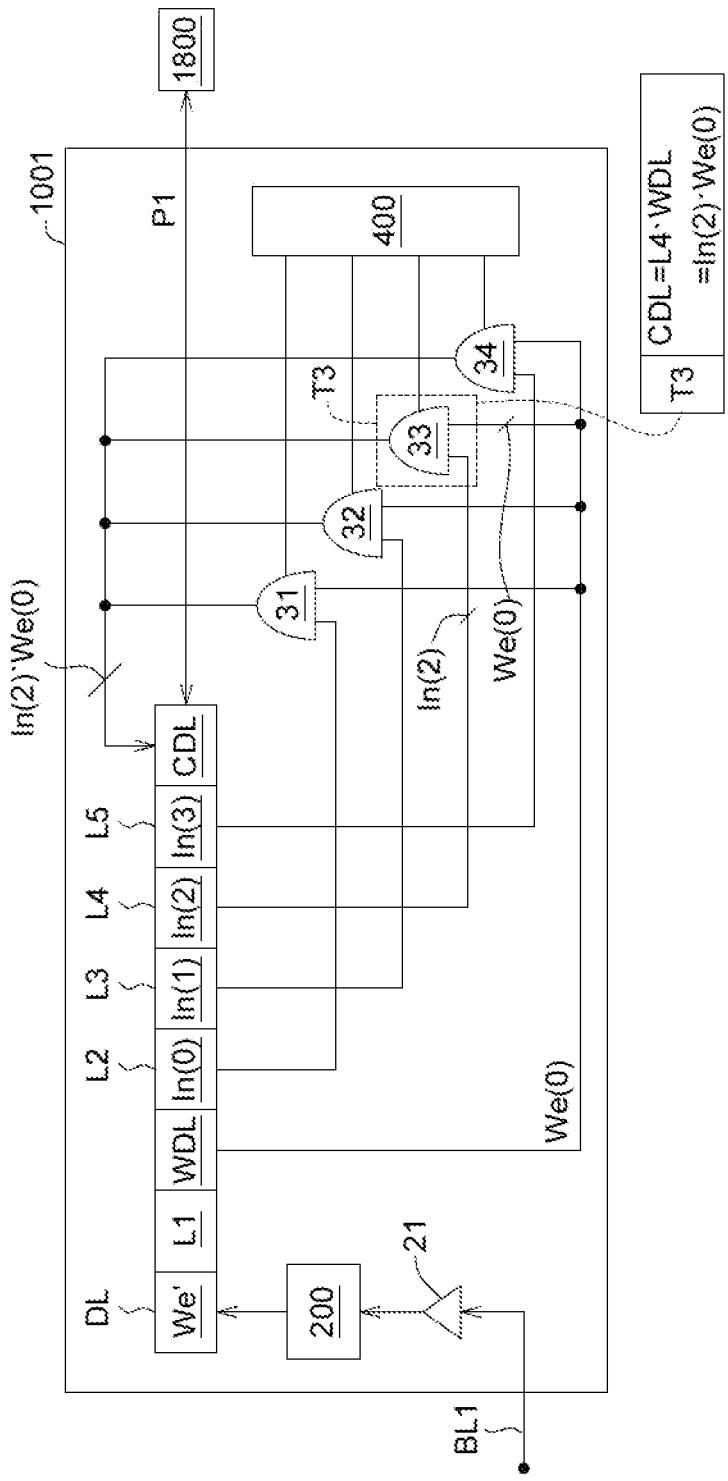
Figure 5H:
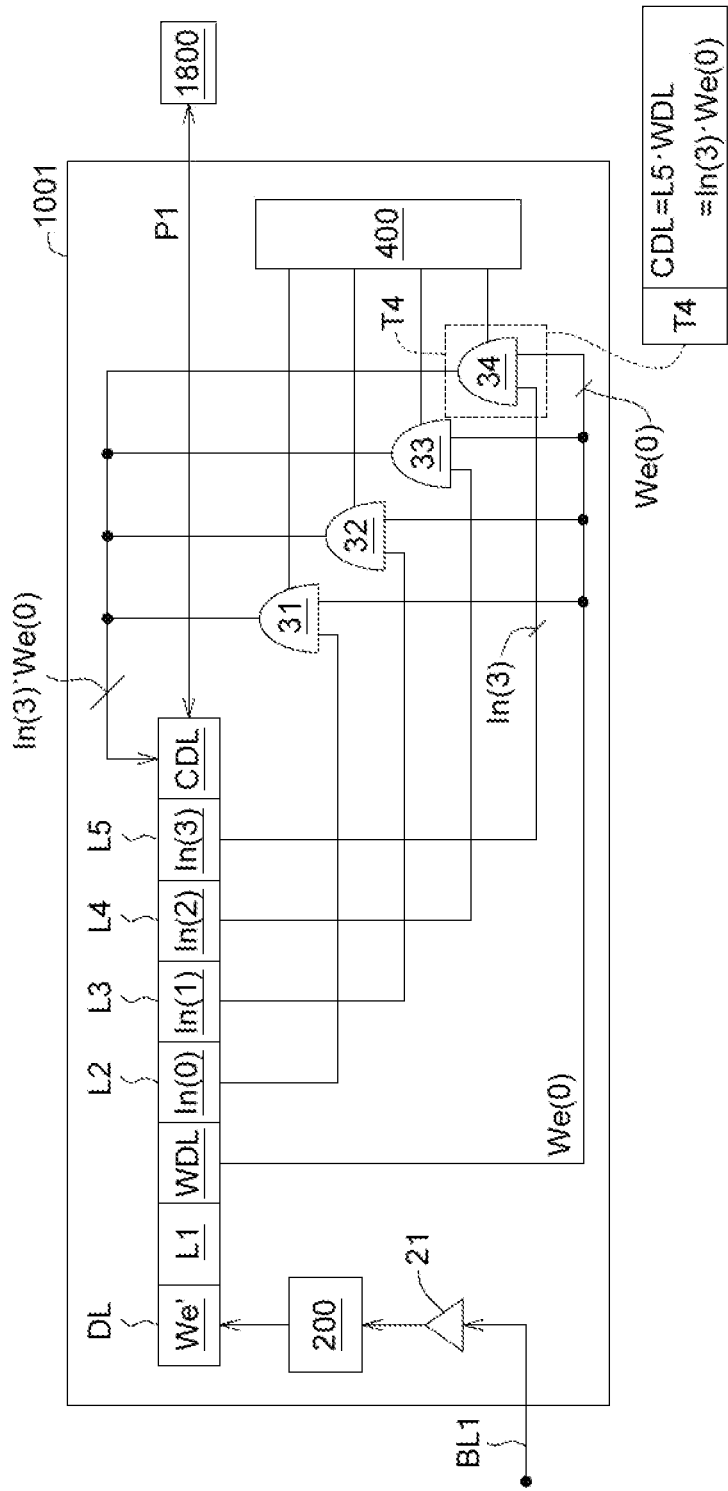

Likewise, if it's determined that the count value cnt is still not equal to the bit width "4" in step S406, steps S400 to S404 are re-executed. As shown in FIG. 5G: in the operation cycle T3, the logic operation unit 33 performs a logic "AND" operation on the bit-data We(0) and the bit-data In(2) to generate the operation result In(2)·We(0), being sent to the latch CDL, and then output to the accumulation circuit 1800 for accumulation operation. Next, as shown in 5H: In the operation cycle T4, the logic operation unit 34 performs the logic AND operation of the bit-data We(0) and the bit-data In(3) to generate the operation result In(3)·We(0), and transferred to the latch CDL, and then outputted to the accumulation circuit 1800.

If in step S406 it's determined that the count value cnt has reached the bit width "4", step S410 is executed: storing the operation result of the accumulation operation of the accumulation circuit 1800. Then step S412 is executed: resetting the count value cnt as "0".

Figure 6:
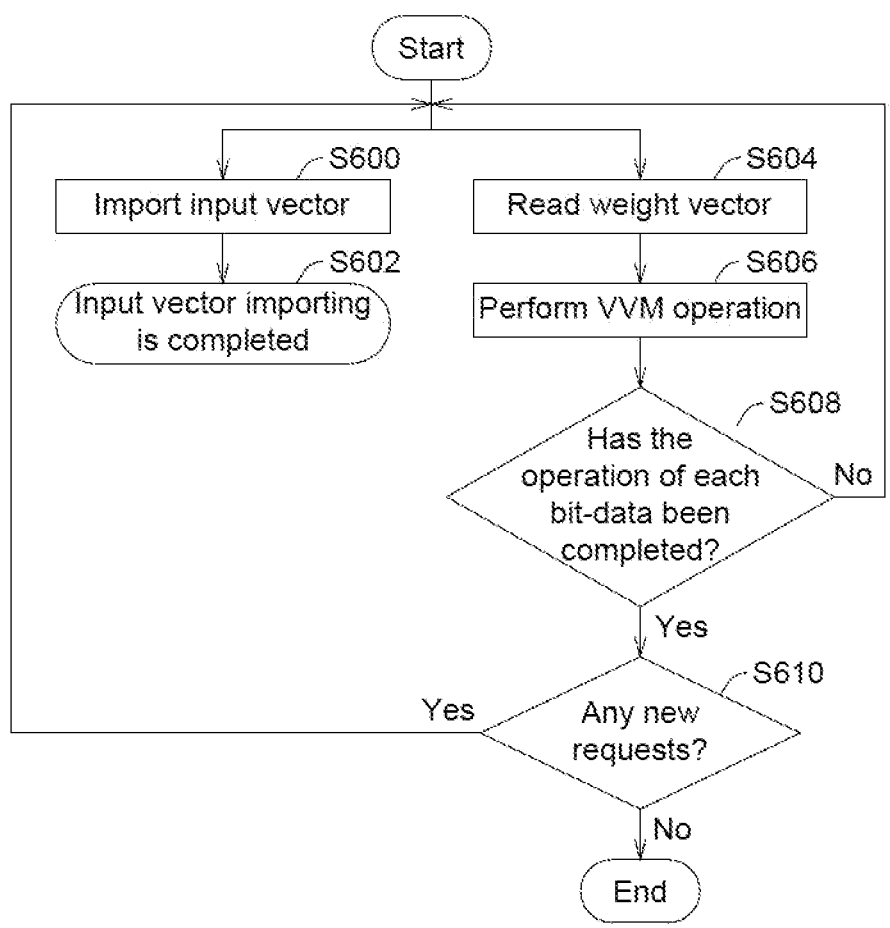
FIG. 6 is a flow chart of another embodiment of the VVM/MAC operations executed by the page buffer unit PB and the accumulation circuit 1800.

On the other hand, please refer to FIG. 6, which is a flow chart of another embodiment of the VVM/MAC operations executed by the page buffer unit PB and the accumulation circuit 1800. In the embodiment of FIG. 6, the latency for the reading procedure of the weight-vector We is not considered, hence the latch WDL is not disposed in the page buffer circuit 1001, and step S604 of FIG. 6 is followed by step S606 to execute VVM operations of the weight-vector We and the input-vector In. There is no need to transfer the weight-vector We to the latch WDL from the latch DL.

Figure 7:
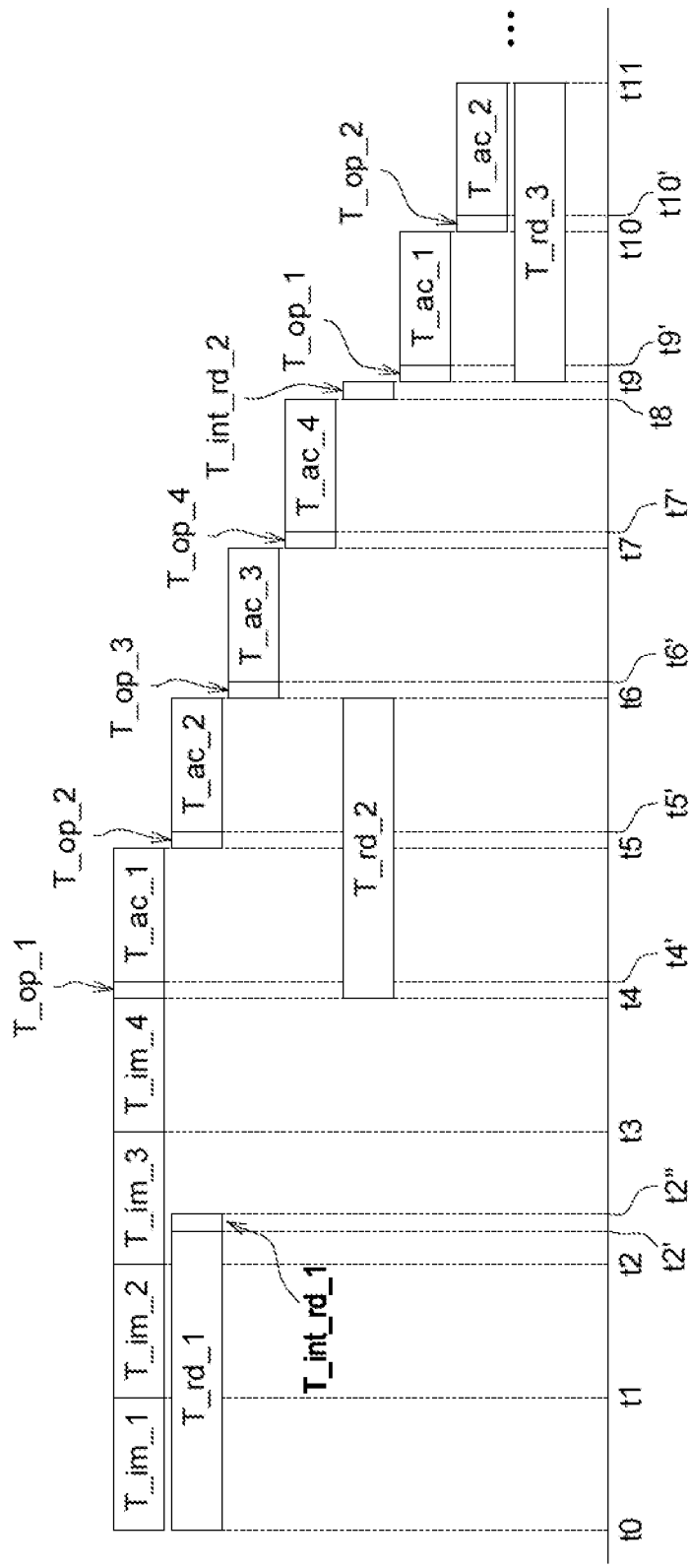
FIG. 7 is a timing diagram of the operation of the page buffer circuit 1001 in the embodiments of FIGS. 5A to 5H.

Next, refer to FIG. 7, which is a timing diagram of the operation of the page buffer circuit 1001 in the embodiments of FIGS. 5A to 5H. The timing diagram of FIG. 7 is described by reference to the flow charts of FIGS. 4B, 4C and 4D. First, during the period between time points t0-t4, the four bit-data In(0)-In(3) of the input-vector In are sequentially imported into the latch CDL and transferred to the corresponding latches L2-L5 (corresponding to step S300 to step S306 in FIG. 4C). For example, during the period T_im_1 between time points t0 and t1, the bit-data In(0) of the input-vector In is imported into the latch CDL and transferred to the latch L2. Then, during the period T_im_2 between time points t1 and t2, the next bit-data In(1) is imported into the latch CDL and transmitted to the latch L3. Then, during the period T_im_3 between time points t2 and t3, the third bit-data In(2) is imported into the latch CDL and transferred to the latch L4. Then, during the period T_im_4 between time points t3 and t4, the fourth bit-data In(3) is imported into the latch CDL and transferred to the latch L5. Each of the periods T_im_1 to T_im_4 has the same time length (for example, 30.72 µs), and the total time length of the periods T_im_1 to T_im_4 is 122.88 µs (i.e., 4×30.72 µs).

The page buffer circuit 1001 of the present disclosure is based on a "pipeline" operation mechanism, and may synchronously read a corresponding bit-data (e.g., We(0)) of the weight-vector We to the latch DL between time points t0 and t3, and transfer them to the latch WDL (corresponding to steps S200 to S206 in FIG. 4B). For example, during the period T_rd_1 between time points t0 and t2', the weight-vector We is first read into the latch DL. The time length of period T_rd_1 is, for example, 70 µs. Then, during the period T_int_rd_1 between time points t2' and t2", the weight-vector We is transferred to the latch WDL. The time length of the period T_int_rd_1 is, for example, 5 µs.

Then, during the period T_op_1 between time points t4 and t4', the logic operation unit 31 performs a logic operation on the bit-data We(0) and the bit-data In(0) to generate an operation result In(0)·We(0), And the operation result In(0)·We(0) is stored in the latch CDL (corresponding to steps S400 and S402 in FIG. 4D). The time length of the period T_op_1 is, for example, 5 µs.

Then, during the period T_ac_1 between time points t4' and t5, the accumulation circuit 1800 performs an accumulation operation based on the operation result In(0)·We(0) (corresponding to step S404 in FIG. 4D). The time length of period T_ac_1 is, for example, 30.72 µs. The operation cycle T1 in FIG. 5E may include the period T_op_1 and the period T_ac_1. Based on the pipeline operation mechanism, the weight-vector We' of the next page pg(m+1) may be read synchronously, starting from time point t4.

Then, during the period T_op_2 between time points t5 and t5', the logic operation unit 32 performs a logic operation on the bit-data We(0) and the bit-data In(1) to generate an operation result In(1)·We(0), And the operation result In(1)·We(0) is stored in the latch CDL. Then, during the period T_ac_2 between time points t5' and t6, the accumulation circuit 1800 accumulates the operation result In(1)·We(0) to the operation result In(0)·We(0). The operation period T2 in FIG. 5F may include the period T_op_2 and the period T_ac_2. At time point t6, storing for the weight-vector We' of the next page pg(m+1) in the latch DL may be completed. That is, storing the weight-vector We' in the latch DL is performed during the period T_rd_2 between time points t4 and t6.

Similarly, during the period T_op_3 between the subsequent time points t6 and t6', the logic operation unit 33 performs a logic operation on the bit-data We(0) and the bit-data In(2), and operation result is stored in the latch CDL. Then, during the period T_ac_3 between time points t6' and t7, the accumulation circuit 1800 performs accumulation. The operation period T3 in FIG. 5G may include the period T_op_3 and the period T_ac_3. Moreover, the operation period T4 in FIG. 5H may include a period T_op_4 and a period T_ac_4, where the period T_op_4 between time points t7 and t7' is used to perform the logic operation of the bit-data We(0) and the bit-data In(3), and store the operation result to the latch CDL. Furthermore, during the period T_ac_4 between time points t7' and t8, an accumulation operation is performed based on the above logic operation result.

Then, during the period T_int_rd_2 between time points t8 and t9, the weight-vector We' of the page pg(m+1) is transferred to the latch WDL from the latch DL.

Then, the period T_op_1 between time points t9 and t9', T_op_1 is used to perform the logic operation of the bit-data In(0) and the bit-data We(0) of the weight-vector We' of page pg(m+1). The period T_ac_1 between t9' and t10 is used to perform an accumulation operation. Then, during the period T_op_2 between time points t10 and t10' is used to perform the logic operation of the bit-data In(1) and the bit-data We(0) of the weight-vector We' of the page pg(m+1), and the period T_ac_2 between t10' and t11 is used to perform an accumulation operation. Moreover, based on the pipeline operation mechanism, storing of the weight-vector We" of the subsequent page pg(m+2) in the latch DL may be completed synchronously during the period T_rd_3 between time points t9 and t11.

In one example, the page buffer circuit 1001 performs logic operations according to the bit width of "4" and the dimension of "512", and totally 512 times of VVM/MAC operations are performed. The storage space of the page buffer circuit 1001 is, for example, 16 KB (i.e., 16×1024×8=131072 bits). In order to perform the above-mentioned VVM/MAC operations with bit-width of "4" and dimension of "512", 2048 memory cells in the memory array 1500 must be used (i.e., 4×512=2048). When a total number of 512 VVM operations (each having the bit-width "4" and the dimension "512") are performed, it is necessary to read the weight-vector We from 8 pages (e.g., pages pg(m) to pg(m+7)), and the request-for-read R_rd has a number of times of "8". Accordingly, the total execution time T_total of the VVM/MAC operations with dimension "512" is 1305.92 µs, as shown in equation (1) and equation (2):

$$T\_total = \qquad (1)$$
$$(N \times T\_im\_1) + \{R\_rd \times [N \times (T\_op\_1 + T\_ac\_1) + T\_int\_rd\_1]\}$$

$$1305.92 \text{ µs} = (4 \times 30.72 \text{ µs}) + \{8 \times [4 \times (5 \text{ µs} + 30.72 \text{ µs}) + 5 \text{ µs}]\} \qquad (2)$$

Figure 8:
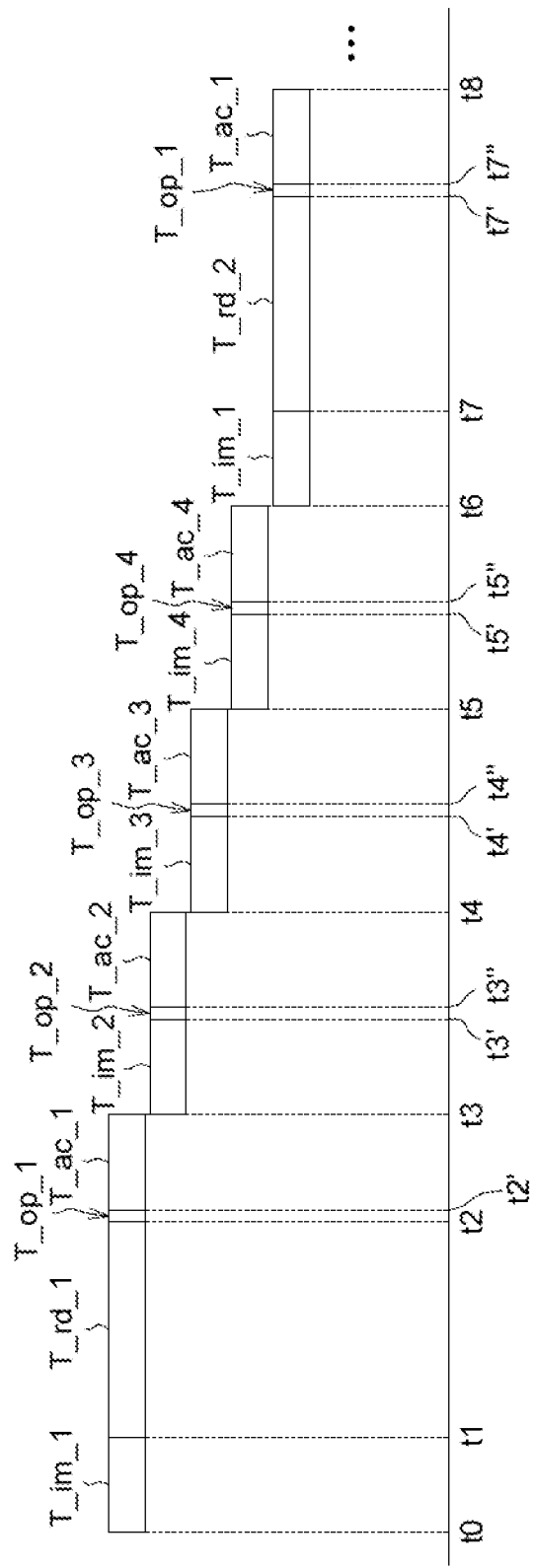
FIG. 8 is a timing diagram of the operation of a vector to vector multiply-accumulator of a comparative example.

Next, refer to FIG. 8, which is a timing diagram of the operation of a vector to vector multiply-accumulator of a comparative example. The vector to vector multiply-accumulator of the comparative example in FIG. 8 performs VVM/MAC operations based on a cycle-by-cycle mechanism. During the period T_im_1 between time points t0 and t1, the bit-data In(0) of the input-vector In is imported into the latch (not shown in the figure). During the period T_rd_1 between time points t1 and t2, the weight-vector We is read into another latch (not shown in the figure). During the period T_op_1 between time points t2 and t2', a logic operation of bit-data We(0) and bit-data In(0) is performed to generate an operation result In(0)·We(0). During the period T_ac_1 between time points t2' and t3, the accumulation circuit performs an accumulation operation based on the operation result In(0)·We(0). Since the comparative example in FIG. 8 executes based on the cycle-by-cycle mechanism (rather than the pipeline operation mechanism of the present disclosure), other operations are not executed synchronously in the periods T_im_1, T_rd_1, T_op_1 and T_ac_1 between time points t0 and t3. Until the accumulation operation ends at time point t3, the importing, reading and logic operation of the next bit-data In(1) and bit-data We(0) are then executed. For example, during the period T_im_2 between time points t3 and t3', the next bit-data In(1) of the input-vector In is imported into the latch. During the period T_op_2 between the time point t3' and t3", logic operation of the bit-data We(0) and the bit-data In(1) is performed, and the accumulation operation is performed during the period T_ac_2 between the time points t3" and t4.

Likewise, with the cycle-by-cycle mechanism, importing of the input-vector and its logic operation and accumulation operation are performed in the periods T_im_3, T_op_3 and T_ac_3 between time points t4 and t5. Then, importing of the next input-vector and its logic operation and accumulation operation are performed in the periods T_im_4, T_op_4 and T_ac_4 between time points t5 and t6.

Then, importing of input-vector, reading of weight-vector of the next page, logic operation and accumulation operation for them, are performed during the period T_im_1, T_rd_2 and T_ac_1 between time points t6 and t8.

A performance comparison is made according to the timing diagram for the page buffer circuit 1001 of the present disclosure in FIG. 7 and the timing diagram for the comparative example in FIG. 8. The page buffer circuit 1001 of the present disclosure operates according to the pipeline operation mechanism. While executing the importing of the bit-data of the input-vector In during the periods T_im_1 to T_im_3, two operations may be performed synchronously: in the first operation, storing the weight-vector We of the current page pg(m) to latch DL during period T_rd_1. In the second operation, storing the weight-vector We in the latch WDL in a manner of internal-transfer during period T_int_rd_1.

Moreover, according to the pipeline operation mechanism, while logic operations on bit-data are performed during periods T_op_1 and T_op_2, and accumulation operations are performed during periods T_ac_1 and T_ac_2, the weight-vector We' of the next page pg(m+1) may be synchronously stored in the latch DL during period T_rd_2.

Therefore, total execution time required for the VVM/MAC operations by the page buffer circuit 1001 with the accumulation circuit 1800 of the present disclosure may be significantly reduced, compared with the cycle-by-cycle mechanism of the comparative example in FIG. 8.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A page buffer circuit adapted for a page-read device, wherein the page read device includes a memory array having a plurality of pages and a plurality of bit lines, the page buffer circuit comprising:
   a plurality of first latches, for receiving a weight-vector from a corresponding one of the pages through the bit lines, and importing an input-vector through a data input/output path, wherein the weight-vector has a plurality of weight bit-data, and the input-vector has a plurality of input bit-data;
   a plurality of second latches, for storing the plurality input bit-data of the input-vector;
   a plurality of logic operation units, coupled to the plurality first latches to receive the plurality weight bit-data, and coupled to the plurality second latches to receive the plurality input bit-data, each of the logic operation units is used to perform a logic operation of a corresponding one of the plurality input bit-data and a corresponding one of the plurality weight bit-data to generate a logic operation result, and the logic operation result is sent to one of the plurality first latches; and
   a control circuit, for selectively enabling the logic operation units to perform the logic operation.

2. The page buffer circuit according to claim 1, wherein the logic operations of the plurality input bit-data and the plurality weight bit-data totally form a logic operation of the input-vector and the weight-vector.

3. The page buffer circuit according to claim 1, wherein the page buffer circuit operates with a plurality of operation cycles, and the control circuit selectively enables one of the logic operation units in a corresponding one of the operation cycles.

4. The page buffer circuit according to claim 1, further comprising:
   a decoding circuit, coupled to a corresponding one of the bit lines, and for decoding the weight-vector to obtain one of the plurality weight bit-data.

5. The page buffer circuit according to claim 4, wherein the plurality first latches comprising:
   a first stage latch, coupled to the decoding circuit to receive a corresponding one of the plurality weight bit-data.

6. The page buffer circuit according to claim 5, wherein the plurality first latches further comprising:
   a weight latch, for receiving the corresponding one of the plurality weight bit-data from the first stage latch, and providing the corresponding one of the plurality weight bit-data to the logic operation units.

7. The page buffer circuit according to claim 1, wherein the plurality first latches comprising:
   a last stage latch, coupled to the data input/output path to receive the corresponding one of the plurality input bit-data.

8. The page buffer circuit according to claim 7, wherein the last stage latch provides the corresponding one of the plurality input bit-data to the plurality second latches.

9. The page buffer circuit according to claim 7, wherein the last stage latch is further coupled to the logic operation units to receive the logic operation results.

10. The page buffer circuit according to claim 9, wherein the page buffer circuit is coupled to an accumulation circuit, and the last stage latch provides the logic operation results to the accumulation circuit through the data input/output path.

11. An operating method of a page buffer circuit adapted for a page-read device, wherein the page read device includes a memory array having a plurality of pages and a plurality of bit lines, the operating method comprising:
    receiving a weight-vector from a corresponding one of the pages through the bit lines by a plurality of first latches of the page buffer circuit and importing an input-vector into the plurality first latches through a data input/output path, wherein the weight-vector has a plurality of weight bit-data, and the input-vector has a plurality of input bit-data;
    storing the plurality input bit-data of the input-vector in a plurality of second latches of the page buffer circuit;
    receiving the plurality weight bit-data from the plurality first latches and receiving the plurality input bit-data from the plurality second latches, by a plurality of logic operation units of the page buffer circuit;
    performing a logic operation of a corresponding one of the plurality input bit-data and a corresponding one of the plurality weight bit-data to generate a logic operation result, by each of the logic operation units;
    sending the logic operation result to one of the plurality first latches; and
    selectively enabling the logic operation units to perform the logic operation, by a control circuit of the page buffer circuit.

12. The operating method according to claim 11, wherein the logic operations of the plurality input bit-data and the plurality weight bit-data totally form a logic operation of the input-vector and the weight-vector.

13. The operating method according to claim 11, wherein the page buffer circuit operates with a plurality of operation cycles, and the control circuit selectively enables one of the logic operation units in a corresponding one of the operation cycles.

14. The operating method according to claim 11, further comprising:
    decoding the weight-vector to obtain one of the plurality weight bit-data, by a decoding circuit of the page buffer circuit.

15. The operating method according to claim 14, further comprising:
    receiving a corresponding one of the plurality weight bit-data from the decoding circuit, by a first stage latch of the plurality first latches.

16. The operating method according to claim 15, further comprising:
    receiving the corresponding one of the plurality weight bit-data from the first stage latch, by a weight latch of the plurality first latches; and
    providing the corresponding one of the plurality weight bit-data to the logic operation units, by the weight latch.

17. The operating method according to claim 11, further comprising:
    receiving the corresponding one of the plurality input bit-data from the data input/output path, by a last stage latch of the plurality first latches.

18. The operating method according to claim 17, further comprising:
    providing the corresponding one of the plurality input bit-data to the plurality second latches, by the last stage latch.

19. The operating method according to claim 17, further comprising:
    receiving the logic operation results, by the last stage latch.

20. The operating method according to claim 19, wherein the page buffer circuit is coupled to an accumulation circuit, and operating method further comprising:
    providing the logic operation results to the accumulation circuit through the data input/output path, by the last stage latch.

* * * * *